United States Patent [19]

Schumacher, II et al.

[11] Patent Number: 5,077,962
[45] Date of Patent: Jan. 7, 1992

[54] MOWING FINGER FOR FINGER-BAR MOWERS

[76] Inventors: Gustav Schumacher, II, Gartenstrasse 8; Guenter Schumacher, Raiffeisenstrasse 10, both of D-5231 Eichelhardt, Fed. Rep. of Germany

[21] Appl. No.: 610,345

[22] Filed: Nov. 5, 1990

Related U.S. Application Data

[63] Continuation of Ser. No. 215,060, Jul. 5, 1988, abandoned.

[30] Foreign Application Priority Data

Jul. 27, 1987 [DE] Fed. Rep. of Germany ....... 3724815

[51] Int. Cl.$^5$ ............................................. A01D 34/18
[52] U.S. Cl. ...................................... 56/310; 56/308
[58] Field of Search ................ 56/229, 240, 246, 289, 56/293, 298, 307, 308, 309, 310, 311, DIG. 13; 29/148.3, 422, 514, 515

[56] References Cited

U.S. PATENT DOCUMENTS 4,612,758 9/1986 Schumacher, II et al. .......... 56/310

FOREIGN PATENT DOCUMENTS 43403 9/1968 Australia .
1097741 7/1961 Fed. Rep. of Germany .
2855234 12/1978 Fed. Rep. of Germany .
3230882 8/1982 Fed. Rep. of Germany .

Primary Examiner—David J. Bagnell
Attorney, Agent, or Firm—W. Thad Adams, III

[57] ABSTRACT

A mowing finger for finger bar mowers of harvesting machines having first and second opposing finger parts each formed of flat material. The first and second finger parts are fixedly secured to each other to define a gap therebetween for mowing action between them. The mowing finger has a tapered front portion located forward of the blade gap and a rear portion secured to a finger bar. One of the first or second finger parts includes a twisted portion twisted around the longitudinal axis of the mowing finger and fixedly secured to the other end of the finger parts to provide increased rigidity to the mowing finger. At least one vegetation-excluding deformation is formed in the first or the second finger parts in the area of the blade gap and extends into the blade gap to narrow and obstruct the blade gap against the accumulation of plant matter therein.

18 Claims, 3 Drawing Sheets

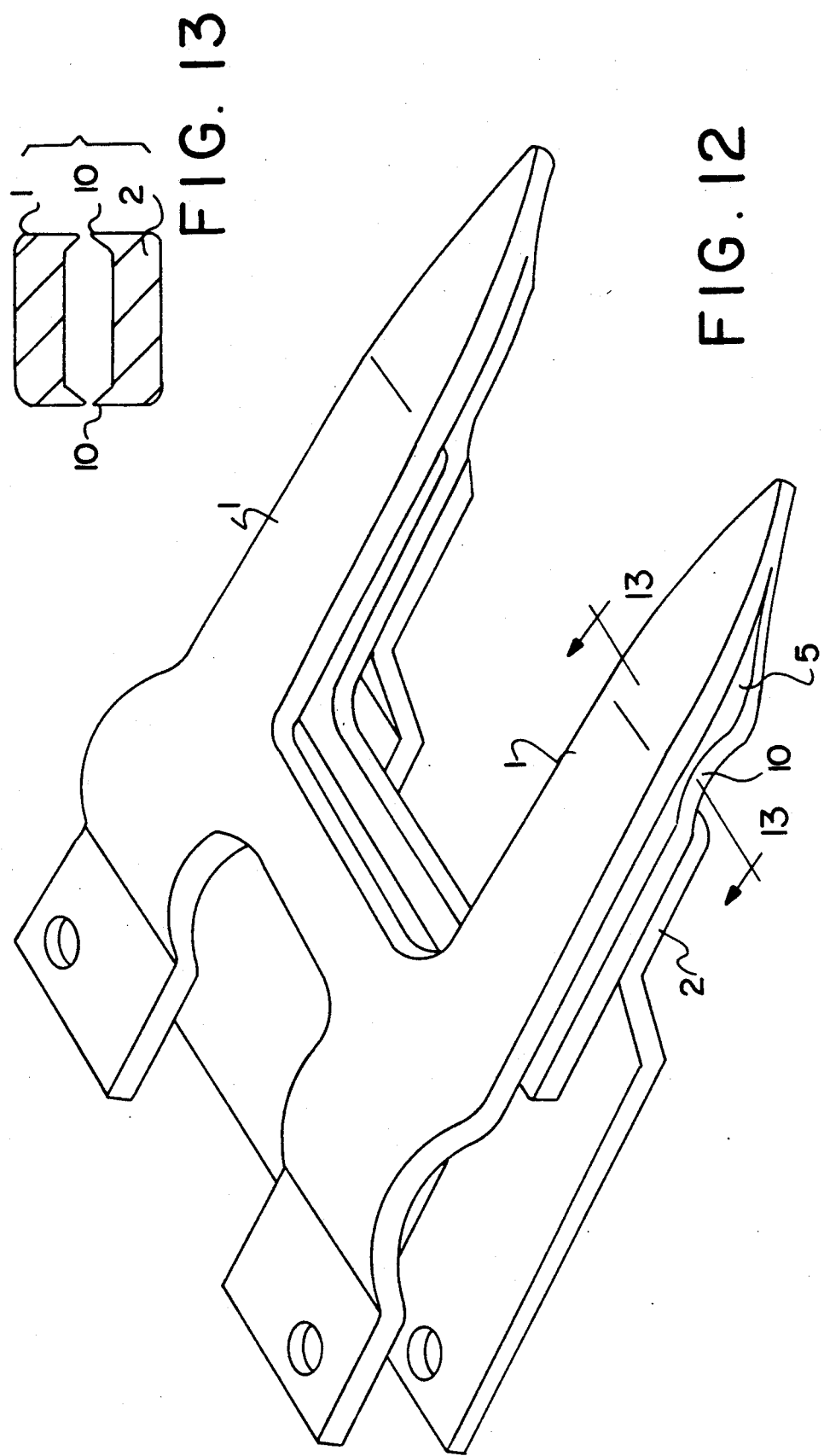

MOWING FINGER FOR FINGER-BAR MOWERS

This application is a continuation of application Ser. No. 215,060, filed 7-5-88, now abandoned.

The invention relates to a mowing finger for finger-bar mowers of harvesting machines, with a finger top part and finger bottom part which are stamped out from flat material and which are each fastened to the finger bar at their rear ends and are connected in front of the blade gap, the finger top part and/or the finger bottom part being twisted and being welded to one another in the twisted region.

Mowing fingers of this type for finger-bar mowers are used in the most diverse embodiments both as single and as multiple fingers. Mowing fingers produced as drop forgings or as castings are the most common. They essentially comprise the stable finger bottom part screwed at its rear end to the finger bar, the forward-pointing fingertip tapering to a point, and the finger lip or finger top part extending rearwards from the fingertip and forming with the finger bottom part a gap in which the cutter blade is moved to and fro.

The finger top part, also called a finger lip, is at one end connected firmly or made in one piece with the fingertip. In most cases, the top part is formed by milling the cutter-blade gap out of the mowing finger forged as a whole.

Other embodiments of mowing fingers of finger-bar mowers are described in Australian Patent Specification 43,403/68 and in German Offenlegungsschrift 2,855,234.

They are composed of stampings which have been obtained by being stamped out from flat material of suitable thickness. At the same time, two or even more stampings are connected to one another by welding, riveting or screwing to form a single or multiple finger (as a rule, a double finger). In such an embodiment, the finger bottom part and finger top part are connected in front of the blade gap, where the two parts rest flat on one another. This connecting region thus forms the mowing-fingertip, whilst the other end of the bottom part and top part are screwed to the finger bar, that is to say behind the cutter-blade gap. As a rule, the cutter-blade gap is formed here by bending the top part or the bottom part or, if appropriate, both of these.

In such an embodiment already known, although the shape of the fingertip tapering to a point in a wedge-shaped manner is very stable in the horizontal direction, nevertheless stability is not very great in the vertical direction, being based namely only on the material thickness of the finger top part and finger bottom part which are connected to one another on this region located in front of the cutter gap.

This low stability in the vertical direction has an especially adverse effect in the mowing-fingertip. If, during rough operation in the field, the tip knocks against an obstacle, such as, for example, a stone or other foreign bodies, the tip easily breaks off or is bent out of shape. Furthermore, on mowing fingers to which ear lifters are fastened, the tips of the mowing fingers are broken off very easily when an ear lifter is overloaded and thereby pulled downwards.

These single, double or multiple mowing fingers which are produced from flat material and in which the finger top part is extended up to the finger bar and is fastened there in the same way as the finger bottom part have, per se, an extremely high stability both horizontally and vertically. Only the mowing-fingertip represents a weak point, as dealt with above.

German Patent Specification 1,097,741 also makes known a finger which is pressed from sheet metal and is intended for the cutting appliance of harvesting machines, and in which the stamped-out finger parts, namely the top part and bottom part, connected to one another in front of the blade gap are deformed in the region in front of the blade gap. However, even this embodiment already known for approximately 25 years has not proved successful in practice, because it lacks the necessary stability.

In the embodiment known from the applicant's own German Offenlegungsschrift 3,230,882, the stabilization of the fingertip is obtained because either the finger top part or the finger bottom part is twisted a specific amount in front of the blade gap and then welded, thereby producing a vertically wedge-shaped tip which has extremely good stability. However, in this design which, in addition to its stability, also affords the advantage of very economical welding, in front of the blade gap there is a wedgeshaped recess, in which harvesting material difficult to cut, such as flax and thin grass, can be caught if it is drawn into the blade gap by a blade which is no longer sharp.

Starting from this known state of the art, the object of the invention is to overcome this disadvantage arising as a result of twisting, without losing the benefit of the twisting and the economical production ensured by this.

According to the invention, this object is achieved because between the front end of the blade gap and the twisted region there are, on the finger top part and/or finger bottom part, one or more projections delimiting the blade gap relative to the twisted region.

Preferably, there are one or more bosses, webs or legs which respectively rest against the other finger part and thereby close the blade gap in this region. At the same time, these projections, bosses, webs or legs can either rest against the respective counterpart sealingly and free of gaps or be welded additionally to the counterpart, that is to say to the adjacent finger part.

It has proved especially advantageous to form on the blank of the finger bottom part, on both sides, additional tabs which, bent to form legs, make a connection with the adjacent finger part. At the same time, these legs can be connected to the adjacent finger part by resistance welding, thus leading to the complete covering of the blade gap between the front end of the blade and the twisted region of the fingertip and ensuring additional stability of the entire fingertip.

The invention is explained in greater detail with reference to the exemplary embodiments illustrated in the accompanying drawings, in which;

FIG. 12 is a perspective view of a mowing finger according to FIG. 3; and

FIG. 13 is a cross-section taken along lines 13—13 of FIG. 12.

In all the exemplary embodiments, the fastening, provided at the end of the mowing finger, of the finger top part and finger bottom part to the finger bar has been omitted for the sake of clarity. As a rule, this fastening is obtained by screwing the end of the finger bottom part and the end of the finger top part extended up to the finger bar to the latter by means of the mowing-finger fastening screw. This type of fastening emerges from German Offenlegungsschrift 2,855,234.

Figure 1:
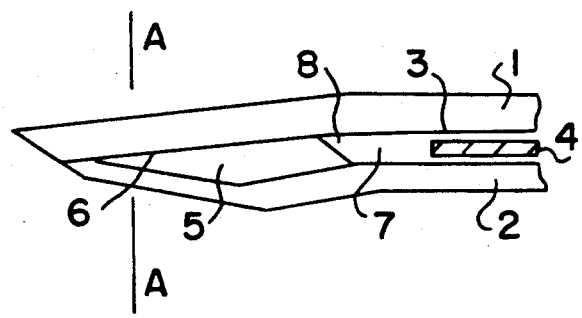
FIG. 1 shows a known mowing-fingertip with a twisted bottom finger, without a design according to the invention, as the state of the art.
Figure 2:
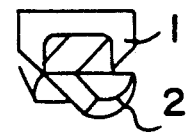
FIG. 2 shows a cross-section along the line A—A according to FIG. 1.

In the known embodiment illustrated in FIGS. 1 and 2, between the top part 1 and bottom part 2 there is a cutter-blade gap 3 in which a mowing-cutter blade 4 is moved to and fro. In front of the blade gap 3, the bottom part 2 is twisted in the region 5 and connected to the top part 1 along the line 6, for example by resistance welding. As result of the twisting, an interspace 7 with an acute-angled edge 8 is obtained between the front end of the blade 4 and the welded joint along the line 6.

It has now been shown that harvesting material difficult to cut becomes jammed in this interspace when the mowing-cutter blade is no longer completely sharp. The blade tip then really presses this harvesting material into this interspace, thus leading to difficulty of movement of the mowing cutter.

According to the invention, this disadvantage is avoided by installing between the blade tip and the start of the twisted region an obstacle which prevents the cut material from escaping from the cutter blade moving to and fro.

According to the invention, this obstacle can be provided, without thereby prejudicing economical production, in a wide variety of ways.

Figure 3:
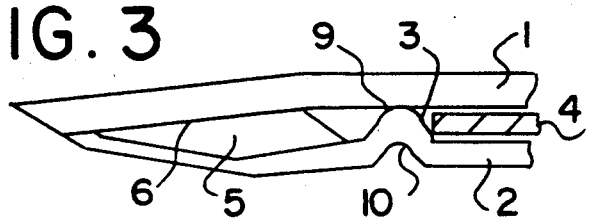
FIG. 3 shows a mowing-fingertip with a web which, according to the invention, is pressed out of the finger bottom part.

In the embodiment according to the invention, illustrated in FIG. 3, the bottom part is equipped, transversely relative to the longitudinal direction, with a corrugation 9 which has been pressed out of the material of the bottom finger upwards and which, when the top part and bottom part are connected, comes sealingly up against the top part 1 in front of the necessary blade gap so as likewise to close off the latter. If the corrugation is of appropriate shape here, it can additionally be welded to the top finger by resistance welding.

Figure 4:
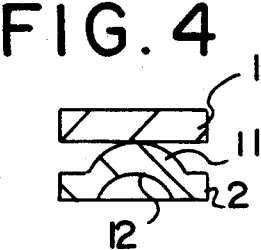
FIG. 4 shows, in cross-section, a mowing-fingertip with a hump which, according to the invention, is pressed out of the finger bottom part.

Since, in this design, the mowing-fingertip is weakened a little in the vertical direction, because a channel 10 is necessarily obtained on the underside of the finger bottom part, it is more expedient, as shown in FIG. 4, to press out a hump 11 upwards in the cross-sectional center of the finger bottom part.

In the side view, a similar picture to that shown in FIG. 3 is thus obtained. Although a conical indentation 12 is produced on the underside of the mowing-finger bottom part, nevertheless the cross-sectional stability is scarcely impaired at all with this conical deformation.

A hump can also be arranged respectively in the top part and bottom part which are directed opposite one another. The two humps then meet at approximately half the height of the cutter-blade gap.

The advantage of this embodiment is that the humps 11 need be formed or pressed out only to half the height of the blade gap.

Figure 5:
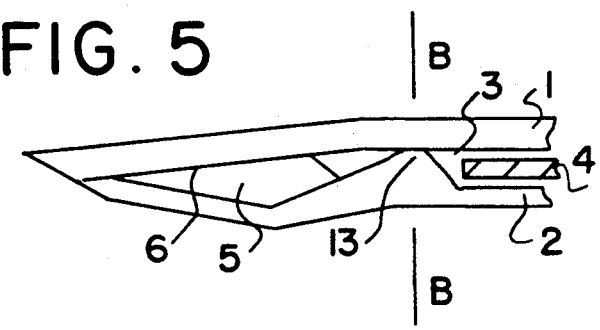
FIG. 5 shows a mowing-fingertip with legs bent up according to the invention.
Figure 6:
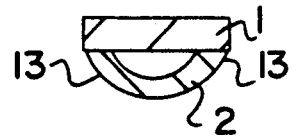
FIG. 6 shows a cross-section along the line B—B according to FIG. 5.

FIGS. 5 and 6 show a further exemplary embodiment of the present invention. In this case, the finger bottom part is shaped upwardly hollow in the region between the blade gap and the twisted portion. The bent-up legs 13 thus form the barrier which prevents the cut material from escaping forwards.

Figure 7:
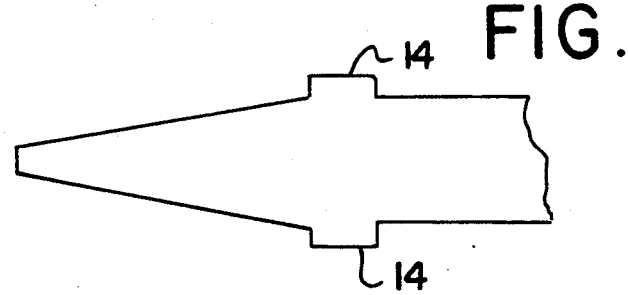
FIG. 7 shows a stamping blank of a finger part with tabs formed on according to the invention.
Figure 8:
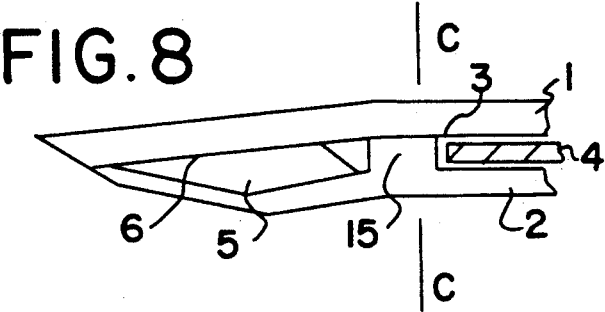
FIG. 8 shows a fingertip with tabs angled according to the invention, as shown in FIG. 7.
Figure 9:
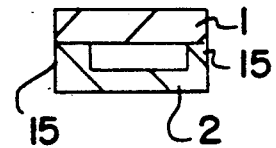
FIG. 9 shows a cross-section along the line C—C according to FIG. 8.
Figure 11:
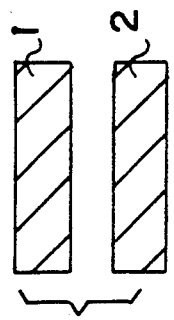
FIG. 11 is a cross-section taken along lines 11—11 of FIG. 10.
Figure 10:
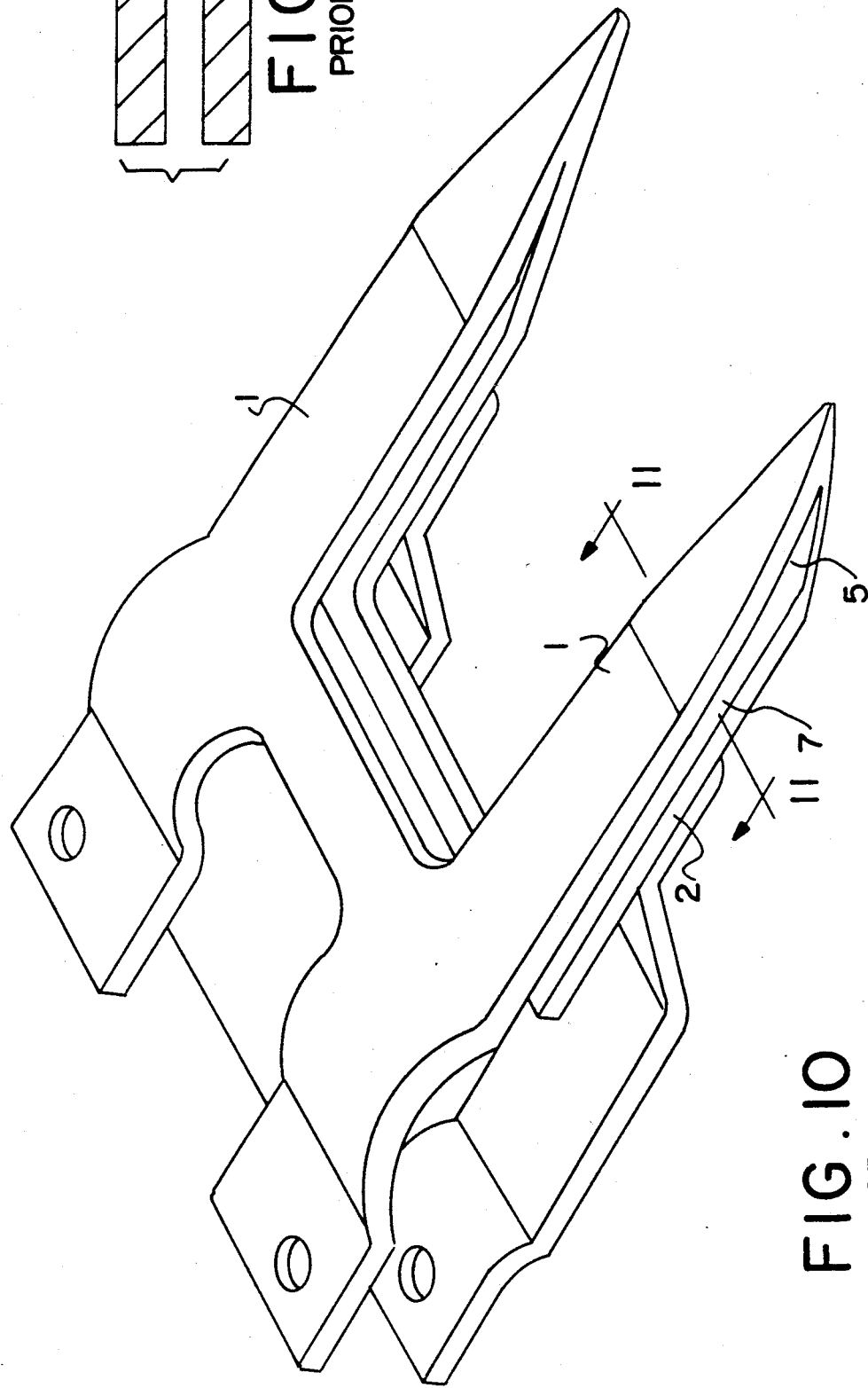
FIG. 10 is a perspective view of a mowing finger according to FIG. 1.

An especially advantageous embodiment emerges from FIGS. 7 to 9. On the stamping blank according to FIG. 7, there are small tab-like portions 14 which project laterally preferably at right angles and which can be shaped in an especially favorable way by appropriate angling into connecting and likewise blocking legs 15.

The deformations for forming the "obstacle", which were explained in conjunction with the bottom finger in the exemplary embodiments dealt with above, can, of course, also be formed on the finger top part, specifically alone or together with the formation on the finger bottom part.

We claim:

1. In a mowing finger for finger bar mowers of harvesting machines, said mowing finger having first and second opposing finger parts each formed of flat material and fixedly secured to each other to define a blade gap therebetween for cooperative mowing action, said mowing finger having a tapered front portion located forward of the blade gap and a rear portion secured to a finger bar, one of said first or second parts including a twisted portion twisted around the longitudinal axis of the mowing finger and fixedly secured to the other of said finger parts to provide increased rigidity to the mowing finger, the improvement which comprises at least one vegetation-excluding deformation on one of said first or second finger parts in the area of the blade gap and extending into the blade gap to substantially narrow and thereby obstruct the blade gap against the accumulation of plant matter therein.

2. A mowing finger according to claim 1, wherein said deformation comprises a web formed from the twisted portion of one of said finger parts.

3. A mowing finger according to claim 1, wherein said deformation comprises a web pressed out of one of said finger parts.

4. A mowing finger according to claim 1, wherein said deformation includes first and second webs formed side-by-side along the length of the mowing finger to further prevent the accumulation of plant matter in the blade gap.

5. A mowing finger according to claim 1, wherein said deformation comprises webs in both first and second finger parts extending towards each other into and narrowing the blade gap.

6. A mowing finger according to claim 1, wherein said deformation comprises webs in both first and second finger parts extending towards each other into and narrowing the blade gap to the point where the first and second finger parts contact each other.

7. A mowing finger according to claim 1, wherein said deformation comprises a substantially U-shaped web in one of the finger parts extending towards the other finger part and narrowing the blade gap on opposite side edges of said mowing finger.

8. A mowing finger according to claim 1, wherein said deformation comprises a substantially U-shaped web in one of the finger parts extending towards the other finger part and narrowing the blade gap on opposite side edges of said mowing finger.

9. A mowing finger according to claim 1, wherein said deformation comprises a separate member joined to said finger part by welding.

10. A mowing finger for finger bar mowers of harvesting machines, said mowing finger comprising a finger top part and a finger bottom part stamped out of flat material and defining a blade gap therebetween, said finger top and bottom parts being connected to one another by welding in a front portion of the finger in front of the blade gap, an opposing end of the bottom finger and the top finger being screwed to a finger bar and either the finger top part or the finger bottom part being deformed in the form of a twisting around the longitudinal axis of the finger and are connected in the twisted area by welding, wherein between the front end of the blade gap and the twisted region there are provided on one or both of the twisted finger part and the flat finger part one or more projections delimiting the blade gap relative to the twisted region.

11. A mowing finger according to claim 10, wherein between the front end of the blade gap and the welded region where the twisted finger part is connected with the flat finger part, there are one or more humps, webs or legs on one of the finger parts which delimit the blade gap relative to the twisted region.

12. A mowing finger according to claim 10, wherein a web pressed out of the finger bottom part is provided as a projection.

13. A mowing finger according to claim 10, wherein a hump pressed out of the finger top part or the finger bottom part is provided as a projection.

14. A mowing finger according to claim 10, wherein a plurality of humps pressed out of the finger top part and/or finger bottom part are provided as projections.

15. A mowing finger according to claim 10, wherein one or more angled or bent legs are provided as respective projection or projections on the finger top part and/or finger bottom part.

16. A mowing finger according to claim 15, wherein lateral tabs are formed in one piece on the finger top part and/or the finger. bottom part and, are bent at right angles, make a connection with the adjacent finger part.

17. A mowing finger according to claim 15, wherein the projection or projections rest respectively against the one or the other of the twisted finger part of the flat finger part.

18. A mowing finger according to claim 15, wherein the projection or projections are respectively welded to one or the other of the twisted finger part of the flat finger part.

* * * * *